US009042907B2

(12) United States Patent
Oka et al.

(10) Patent No.: US 9,042,907 B2
(45) Date of Patent: May 26, 2015

(54) LOCATION IDENTIFICATION OF A PORTABLE ELECTRONIC DEVICE BASED ON CHARACTERISTICS OF AN OPERATING ENVIRONMENT OF THE PORTABLE ELECTRONIC DEVICE

(75) Inventors: Anand Ravindra Oka, Waterloo (CA); Christopher Harris Snow, Kitchener (CA); Robert George Oliver, Waterloo (CA)

(73) Assignee: BlackBerry Limited, Waterloo (CA)

( * ) Notice: Subject to any disclaimer, the term of this patent is extended or adjusted under 35 U.S.C. 154(b) by 601 days.

(21) Appl. No.: 13/416,489

(22) Filed: Mar. 9, 2012

(65) Prior Publication Data

US 2013/0237242 A1 Sep. 12, 2013

(51) Int. Cl.
*H04W 4/02* (2009.01)
*H04W 4/00* (2009.01)

(52) U.S. Cl.
CPC ............... *H04W 4/02* (2013.01); *H04W 4/008* (2013.01)

(58) Field of Classification Search
CPC ....................................................... H04W 4/02
USPC ............................................ 455/456.1–456.5
See application file for complete search history.

(56) References Cited

U.S. PATENT DOCUMENTS

| 8,106,828 | B1 | 1/2012 | Do et al. |
| 2004/0205509 | A1 | 10/2004 | Lou |
| 2005/0176442 | A1 | 8/2005 | Ju et al. |
| 2005/0246334 | A1 | 11/2005 | Tao et al. |
| 2006/0019679 | A1 | 1/2006 | Rappaport et al. |
| 2006/0183450 | A1 | 8/2006 | Cameron |
| 2007/0005589 | A1 | 1/2007 | Gollapudi |
| 2007/0139269 | A1 | 6/2007 | Chen et al. |
| 2008/0004036 | A1 | 1/2008 | Bhuta et al. |
| 2008/0076430 | A1 | 3/2008 | Olson |
| 2008/0176583 | A1 | 7/2008 | Brachet et al. |
| 2008/0186234 | A1 | 8/2008 | Alles et al. |
| 2008/0215291 | A1* | 9/2008 | Wegerich ...................... 702/181 |
| 2009/0109095 | A1 | 4/2009 | Hido et al. |

(Continued)

FOREIGN PATENT DOCUMENTS

| WO | 0034799 A1 | 6/2000 |
| WO | 2005062006 A2 | 7/2005 |
| WO | 2005062066 A2 | 7/2005 |
| WO | 20060117587 A1 | 11/2006 |

OTHER PUBLICATIONS

Barker Brettel, Response to extended European Search Report dated Apr. 2, 2013, filed in European Patent Application No. 12158949.3-1248.

(Continued)

*Primary Examiner* — Michael T Vu
(74) *Attorney, Agent, or Firm* — Ridout & Maybee LLP

(57) ABSTRACT

A location label may be determined for a portable electronic device. The location label may provide a textual indication of the particular location of a user of the portable electronic device, such as a restaurant name, or more generally a type of location of the user, such as simply a restaurant. The location label is determined based on a signature vector of operating environment characteristics of the portable electronic device. The operating environment characteristics may include sensor values, visible transmitters, radio connection information, executing applications or other operating environment characteristics that can have a value associated with them.

21 Claims, 11 Drawing Sheets

(56) References Cited

U.S. PATENT DOCUMENTS

| | | | |
|---|---|---|---|
| 2009/0210418 | A1 | 8/2009 | Arasu et al. |
| 2010/0094840 | A1 | 4/2010 | Donnelly et al. |
| 2010/0171993 | A1 | 7/2010 | Longobardi et al. |
| 2011/0269479 | A1 | 11/2011 | Ledlie |
| 2012/0264446 | A1* | 10/2012 | Xie et al. .................. 455/456.1 |

OTHER PUBLICATIONS

Haiying Shen et al, Locality Sensitive Hashing Based Searching Scheme for a Massive Database, SouthEastcon, 2008, IEEE, Piscataway N.J., USA, Apr. 3, 2008, pp. 123-128. XP031245568.

European Search Report dated Aug. 17, 2012 from corresponding EP application No. 12158949.3.

United States Patent and Trademark Office, Office Action dated Oct. 11, 2013, issued in U.S. Appl. No. 13/416,538.

Norton Rose Fulbright, Response to Office Action filed Jan. 3, 2014 in U.S. Appl. No. 13/416,538.

Canadian Intellectual Property Office, Examiner's Requisition Dated Aug. 25, 2014, issued on corresponding Canadian Patent Application No. 2,808,109.

European Patent Office, extended European Search Report dated Nov. 21, 2014, issued in European Patent Application No. 14188112.8-1811.

* cited by examiner

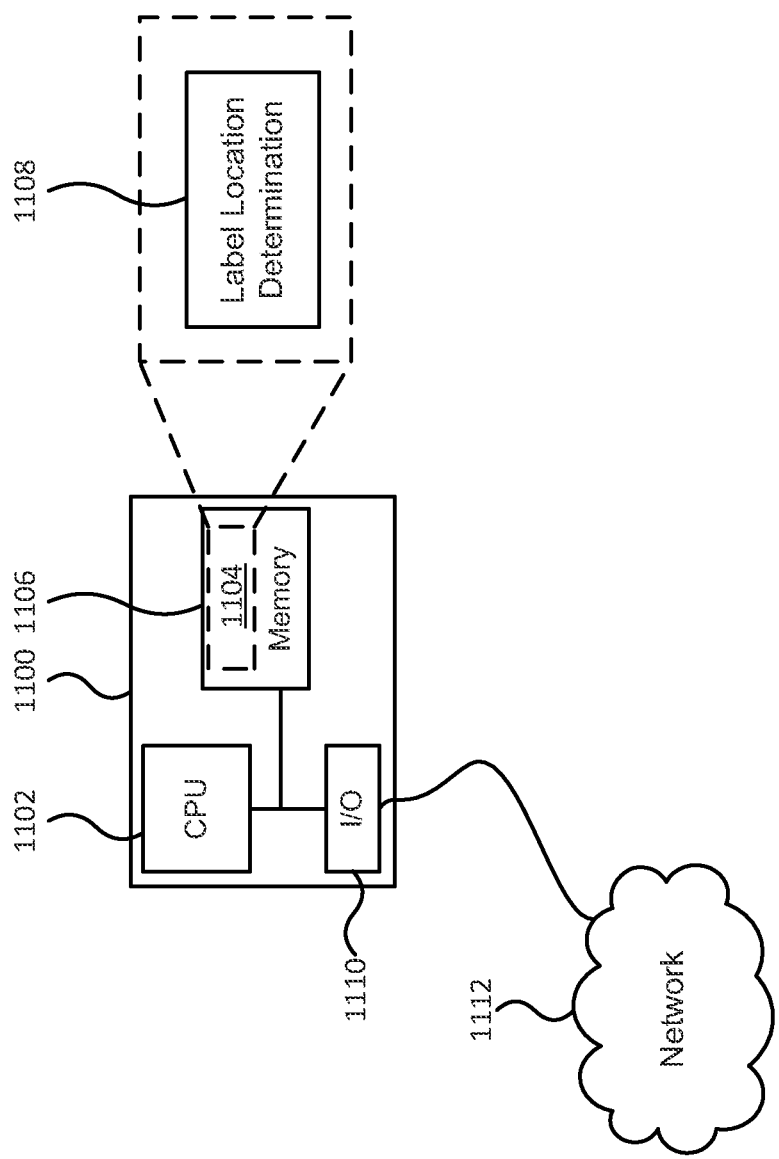

LOCATION IDENTIFICATION OF A PORTABLE ELECTRONIC DEVICE BASED ON CHARACTERISTICS OF AN OPERATING ENVIRONMENT OF THE PORTABLE ELECTRONIC DEVICE

TECHNICAL FIELD

The current description relates to determining a location label associated with a portable electronic device, and in particular to determining a location label based on characteristics of an operating environment of the portable electronic device.

BACKGROUND

For portable electronic devices location information can be determined by utilizing positioning technologies such as global navigation satellite system (GNSS) utilizing a global positioning system (GPS) receiver of a portable electronic device, assisted GPS (A-GPS) such as Wi-Fi or network based positioning, cell-tower observed time difference of arrival (OT-DOA), enhanced observed time difference (E-OTD) technologies etc. The location of the portable electronic device can be provided in terms of geographical coordinates which is associated with a particular location. Location based services (LBS) or location based functions of a device can utilize the coordinates of the portable electronic device to provide information to a user, or perform functions such as configuring the device based upon the location. However, the services or functions must be defined against a location limiting the functionality that can be provided.

It is desirable to provide an improved system and method of location identification for portable electronic devices.

BRIEF DESCRIPTION OF THE DRAWINGS

Further features and advantages of the present disclosure will become apparent from the following detailed description, taken in combination with the appended drawings, in which:

FIG. 11 depicts a computing device for determining a location label of a portable electronic device.

DETAILED DESCRIPTION

Figure 1:
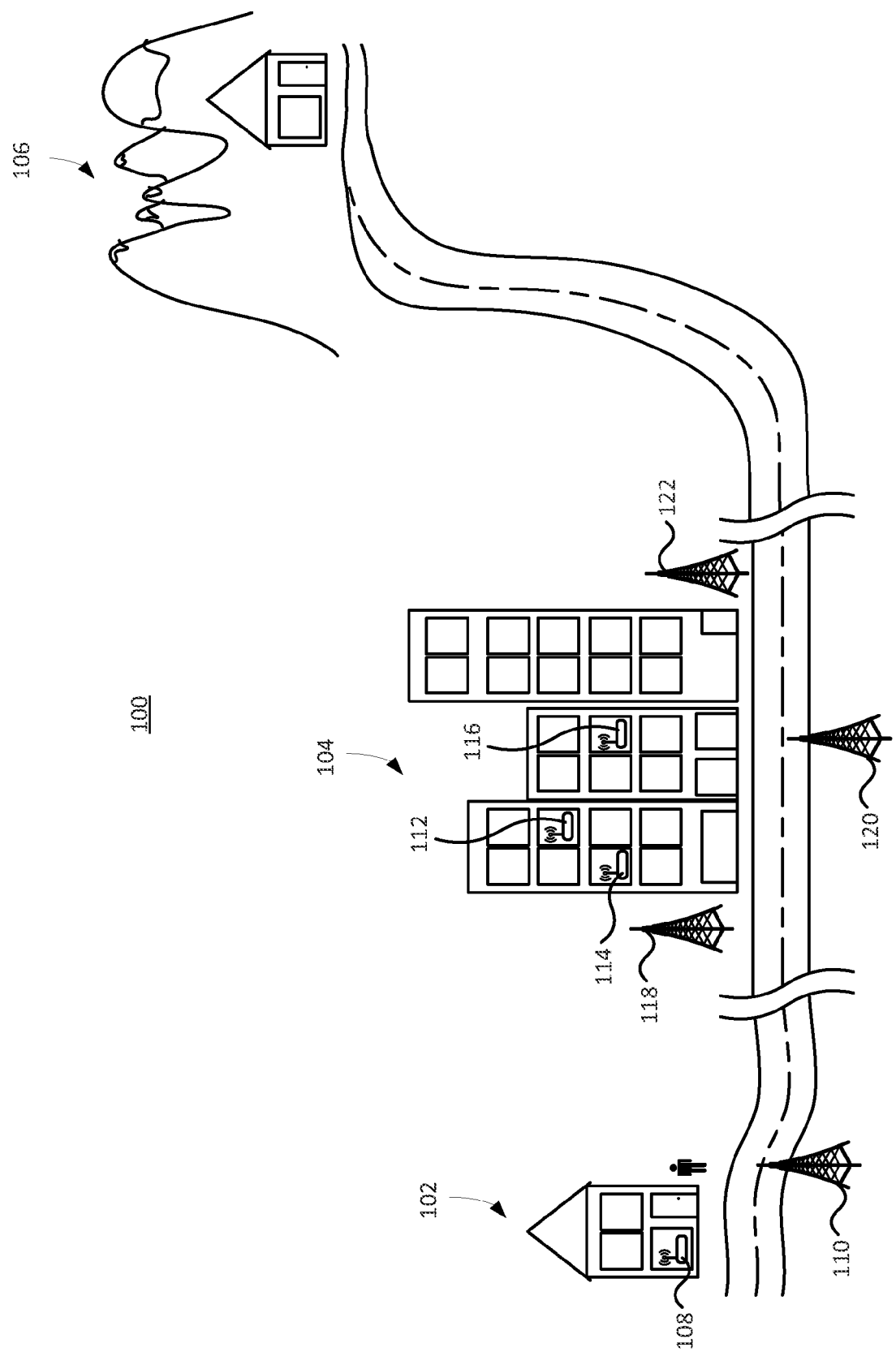
FIG. 1 depicts an environment in which the identification of a labelled location for a device may be used.

The details and particulars of these aspects of the technology will now be described below, by way of example, with reference to the attached drawings.

In accordance with an aspect of the present disclosure there is provided a method of identifying a location label of a portable electronic device, the method comprising: receiving values of a plurality of characteristics of an operating environment of the portable electronic device, each of the plurality of characteristics of the operating environment associated with a respective pre-determined unique identifier; generating a query signature vector from pairs of: i) a respective pre-determined unique identifier associated with each one of the plurality of characteristics of the operating environment and ii) the determined value of the operating environment characteristic of the respective pre-determined unique identifier; and determining the location label for the portable electronic device from one or more signature vectors each associated with a respective location label that are similar to the query signature vector.

In accordance with yet an aspect of the present disclosure there is provided a server for identifying a location label of a portable electronic device, the server comprising: a memory containing instructions; and a processor for executing instructions, the instructions when executed by the processor configuring the server to provide functionality for: determining values of a plurality of characteristics of an operating environment of a portable electronic device, each of the plurality of characteristics of the operating environment associated with a respective pre-determined unique identifier; generating a query signature vector from pairs of: i) a respective pre-determined unique identifier associated with respective one of the plurality of characteristics of the operating environment and ii) the determined value of the operating environment characteristic of the respective pre-determined unique identifier; and determining the location label for the portable electronic device from one or more signature vectors each associated with a respective location label that are similar to the query signature vector.

In accordance with still yet another aspect there is provided a computer readable memory containing instructions for identifying a location label of a portable electronic device, the instructions which when executed by a processor perform the method of: determining values of a plurality of characteristics of an operating environment of a portable electronic device, each of the plurality of characteristics of the operating environment associated with a respective pre-determined unique identifier; generating a query signature vector from pairs of: i) a respective pre-determined unique identifier associated with each one of the plurality of characteristics of the operating environment and ii) the determined value of the operating environment characteristic of the respective pre-determined unique identifier; and determining the location label for the portable electronic device from one or more signature vectors each associated with a respective location label that are similar to the query signature vector.

Currently location detection methods are based on physical location and not the label of the location. Identifying a location label of a portable electronic device, or simply device for brevity, is described further herein. Often the geographic coordinates of the location matter less then the label that is applied to it. For example the labels 'Office' or 'Home' are much more useful for many applications then there corresponding latitude and longitude geographical coordinates. Given this it would be desirable to learn the characteristics of these locations so the device can then predict what location it currently is in. The location label can then be utilized by the device in terms of configuration or functions to suit user preferences, or the location label may be used by LBS to provide content or information to the device.

In addition, in order to determine a location label, the portable electronic device may be required to know its geographical position to a high degree of accuracy. For example, if two restaurants are physically located next to each other and have location labels associated with their respective geographical positions, a portable electronic device may not be able to determine its physical position with high enough accuracy to determine which restaurant the portable electronic device is located in. The identified location label may be used by the device for various reasons, including changing one or more settings of the device such as modifying a notification profile or disabling a wireless radio or determining information that should be provided to the device. As described further herein, the location label may be determined based on a plurality of determined values of characteristics of an operating environment of the device. A signature of the determined characteristic values can be generated and used to determine similar signatures previously captured and associated with a location label. The characteristics of the operating environment included in the signature may include but not limited to various sensor values, such as a light sensor value, microphone levels, gyroscope readings, etc. The characteristics may also include, for example, identification of one or more processes or applications executing on the device, output of one or more processes or applications, or other types of information. The location label associated with a similar signature may be used to identify the location label of the device. Each of the location labels may be a text label, or an index into a store of text labels, and may be arranged in a hierarchical manner. For example, a hierarchy of labels may broadly label a location as a restaurant, more specifically as a Chinese restaurant, and more specifically still by a particular restaurants name. The signatures generated by the device can be used by a learning algorithm to determine locations which present similar characteristics FIG. 1 depicts an environment in which the identification of a location label for a device may be used. Three different physical locations 102, 104, 106 are depicted. It is assumed that the physical locations are a user's home 102, office 104 and cottage 106 and are associated with appropriate location labels. In each of the different locations, sensors of the user's device, or more generally characteristics of the device's operating environment, may have different readings or values particular to the associated location. A signature vector of the values or readings may be generated and used in identifying the location label of the device by comparing the generated signature vector to previously captured signature vectors that have been associated with a location label.

In the following description of FIG. 1, it is assumed that the characteristic values of the operating environment included in the signature vector are an indication of the number of Wi-Fi networks visible from the particular location and an indication of the number of cellular transmitters visible from the particular location. It will be appreciated that the description of FIG. 1 is simplified, and that in a practical application of the location label identification, the number of Wi-Fi networks and cellular transmitters visible from a device would likely not be sufficient in identifying a particular location label. That is, many different location labels, and categories of location labels, could have the same number of Wi-Fi networks and cellular transmitters visible, and as such would be incorrectly associated with the same signatures. Signatures that can be used in a practical system for identifying a location label are described further below. Continuing with the simplified example, when the user's device is located in the home location 102, a single Wi-Fi network 108 and a single cellular transmitter 110 are visible. Similarly, when the user's device is located in the office location 104, the device will see three Wi-Fi networks 112, 114, 116 and three cellular transmitters 118, 120, 122. When the user's device is located in the cottage location 106, no Wi-Fi networks or cellular transmitters are visible.

From the above, two element signature vector can be generated for each location using the number of visible Wi-Fi networks as the value of the first element and the number of visible cellular transmitters as the value of the second element. So for example the signature vector of the home location 102 would be [1,1], the signature vector of the office location 104 would be [3,3] and the signature vector of the cottage location 106 would be [0,0]. Then, assuming location labels have been previously associated with the signature vectors of each location, a user's device can determine its location label by generating a signature vector from the visible Wi-Fi networks and the visible cellular transmitters. The generated signature vector can then be compared to the previously captured signature vectors and the location label associated with the closest, or most similar, previously captured signature vector used as the location label of the user's device.

As described above, FIG. 1 is intended to depict the general concept of using a device's signature vectors to identify a location label of the device. The signature vector size described above may be too small to identify a location label in a practical embodiment. However, by incorporating additional sensor readings, or more broadly additional characteristic values of the operating environment of the device, into to signature vector, it may be possible to identify a location label in a practical embodiment.

Figure 2:
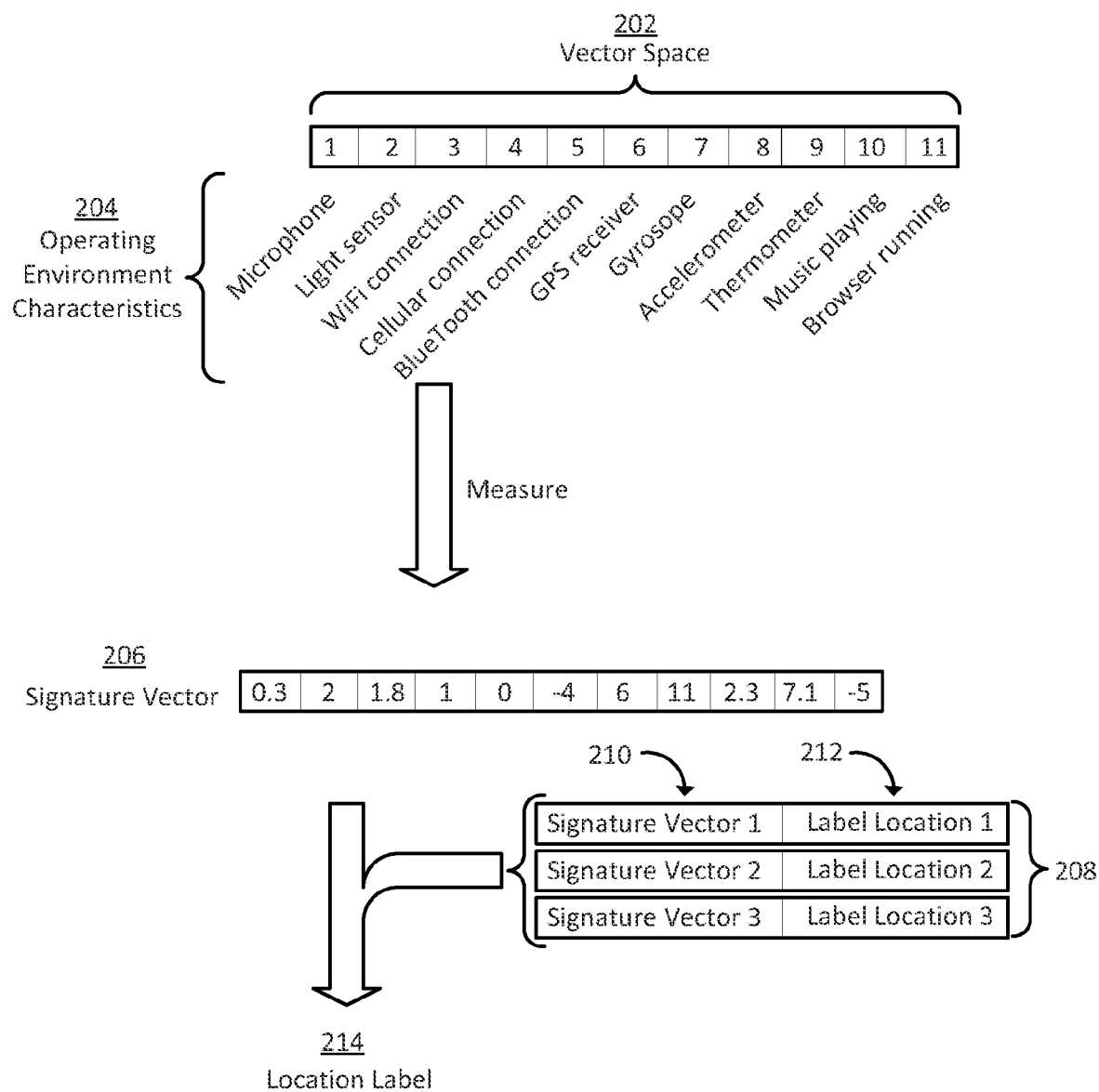
FIG. 2 depicts schematically a process of identifying a labelled location using a signature vector for a number of operating environment characteristics.

FIG. 2 depicts schematically a process of identifying a location label using a signature vector for a number of operating environment characteristics. A signature vector space 202 defines an ordering of operating environment characteristics 204 whose associated values are measured or determined at the device in order to generate a signature vector. The depicted signature vector space 202 has a dimensionality of 11. As depicted, the first element in the signature vector space 202 corresponds to a microphone sensor, which could have a value associated with the volume of sound. The second element in the signature vector space 202 corresponds to a light sensor, which could have a value associated with a light intensity measured at the device. The third element in the signature vector space 202 corresponds to Wi-Fi connections, which could have a value associated with the number of visible Wi-Fi networks, or could have a value associated with a received signal strength indicator (RSSI) of a connected Wi-Fi transmitter. Similarly the fourth element in the signature vector space 202 corresponds to cellular connections, which could have a value associated with the number of visible cellular transmitters, or could have a value associated with an RSSI of a cellular transmitter. The fifth element in the signature vector space 202 corresponds to Bluetooth connections, which could have a value associated with the number of visible Bluetooth device, or could have a value associated with a received signal strength indicator (RSSI) of a connected Bluetooth device. The sixth element of the signature vector space 202 corresponds to a GPS receiver which could have a value associated with the determined accuracy of a GPS location. The seventh element of the signature vector space 202 corresponds to a gyroscope, which could have a value associated with a rate of change in a rotation of the device. The eighth element of the signature vector space 202 corresponds to an accelerometer, which could have a value associated with a translation of the device along a particular axis. Although only on accelerometer sensor is depicted as being included in the signature vector space 202, it is contemplated that additional accelerometers could be included, for example one for each of the x, y and z axes. The ninth element of the signature vector space 202 corresponds to a temperature sensor, which could have a value associated with a temperature measured at the device. The tenth element in the signature vector space 202 corresponds to an indication of whether or not music is playing on the device, and could have a value of 1 or 0 indicating music is or is not playing. The eleventh element in the signature vector space 202 corresponds to an indication of whether or not a browser is executing on the device, and could have a value of 1 or 0 indicating whether a browser is running or not.

Although various specific operating environment characteristics are described as being included in the signature vector space 202, it is contemplated that different or additional operating environment characteristics could be included in the signature vector space 202.

Once the signature vector space 202 is defined, a device can generate a signature vector 206 by determining a value associated with each of the operating environment characteristics defined in the signature vector space 202. The generated signature vector 206 may then be used to compare to one or more labeled signature vectors 208, that is a previously captured signature vector 210 that has been associated with a location label 212. The location label associated with the previously captured signature vector that is determined to be the closest to the generated signature vector may be used as the location label 214 of the device.

The one or more labeled signatures 208 that are compared to the devices generated signature 206 may be stored on the device. For example, a user could generate a signature vector and associate the desired location label with the signature, which may then be stored on the device. When a new signature vector is generated at the device, it can then be compared to each of the user's location labels, and the closes or most similar location label returned.

The above has described identifying a single location label from the location label associated with the signature vector that is the closest to device generated signature vector. It is contemplated that two or more possible location labels could be provided based on two or more labeled signatures that are determined to be close to the device generated signature vector. Further, in addition to simply providing a plurality of possible location labels, it is possible to provide an indication of which of the location labels is more likely. A likelihood that a location label is correct can be determined in various ways, including being based on a closeness between the labeled signatures and the generated signature vector. For example the geometrical distance between the signature vectors can be used to provide a percentage to each of the identified location labels indicating which one is likely correct. If two possible location labels are identified, the geometrical closeness between the signature vector of each of the location labels and the generated signature vector can be used to determine the likelihood each location label is correct. So, for example, the first location label could have a 90% likelihood of being correct, while the second location label could have a 10% likelihood of being correct.

The above has described the labeled signatures as being stored locally on a user's device. It is contemplated that labeled signatures could be stored at a server. The labeled signatures stored at the server could be received from a plurality of users. Each user may submit signature vectors with an associated location label to the server. A user may then submit a signature vector to query against the stored labeled signatures at the server. Storing labeled signatures at a server may allow a user to identify a location label for a location which they have not previously visited.

The labels associated with locations may be arranged in a hierarchical manner. For example, a particular physical location may be associated with a label indicating a name of a restaurant of the physical location. The restaurant name may be associated with other labels in a hierarchical manner, for example indicating that the particular restaurant is a sit down restaurant, which may be more broadly an Italian restaurant and more broadly still a restaurant. If enough signature vectors are stored at a server, it may be possible to identify a common signature vector that identifies the labels at the different hierarchical levels of the labels. For example, in order to identify a particular restaurant, it may be necessary to have previously captured a signature vector at the particular restaurant location. However, if enough signature vectors from different restaurants in different physical locations are captured, it may be possible to identify a portion of the signature vector common to all the different restaurants. Then, if a generated signature vector that has a portion that matches, or is similar to, the identified portion common to restaurants is received from a user at an unknown restaurant, which does not have an associated specific location label, it may be possible to identify the location label as a restaurant.

Figure 3:
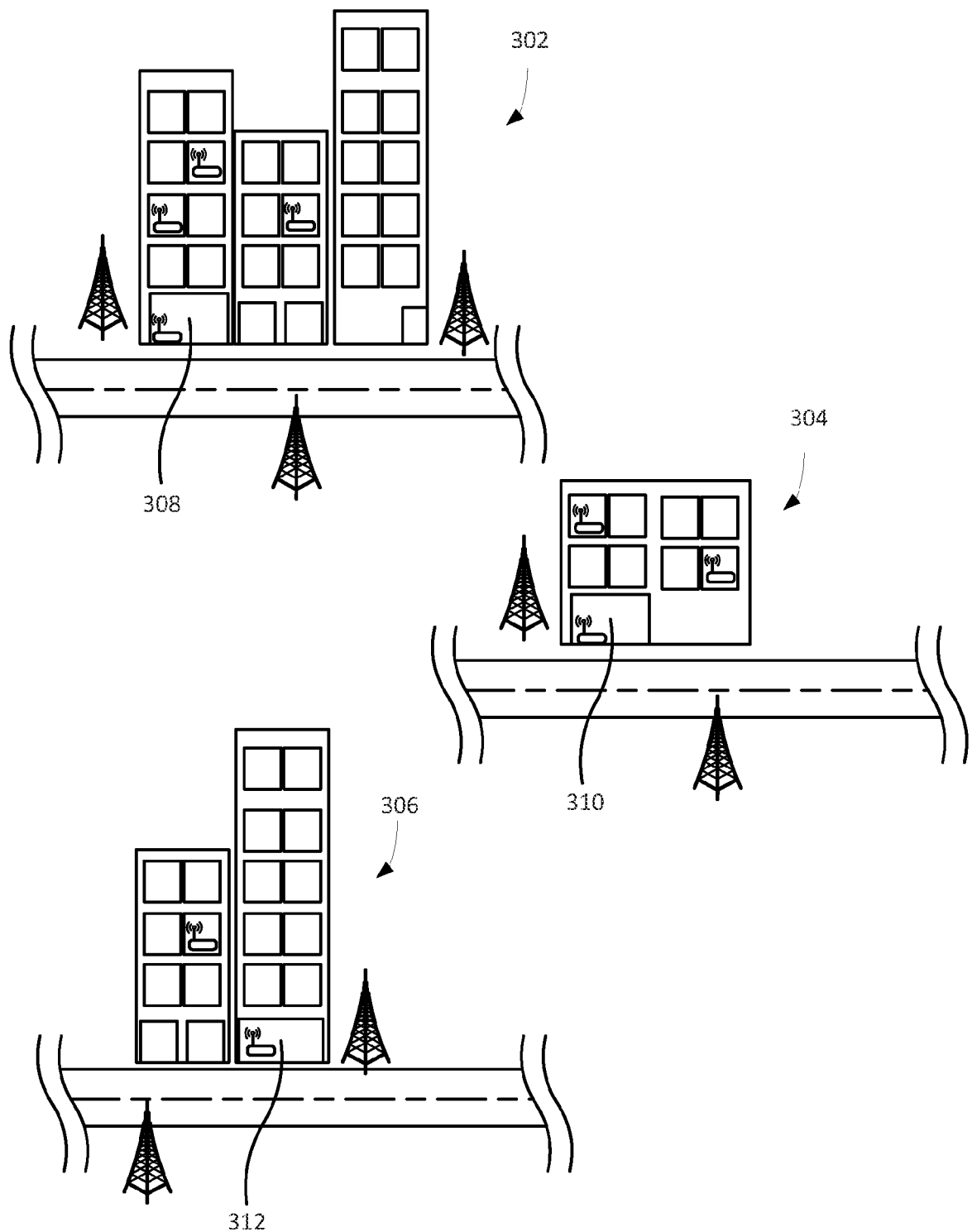
FIG. 3 depicts an environment in which the identification of a labelled location for a device may be used.

FIG. 3 depicts an environment in which the identification of a location label for a device may be used. Similar to FIG. 1, there are a plurality of different physical locations 302, 304, 306. However, in contrast to FIG. 1, in which each of the location labels 102, 104, 106 were associated with a particular location of a user, the location labels 302, 304, 306 may be provided by a plurality of different users, from different physical locations. As depicted, each physical location 302, 304, 306 may have a common type of location such as a restaurant 308, 310, 312. Although the particular locations 308, 310, 312 may be different particular restaurants they may have a common signature portion that can identify the location as a restaurant. For example, each location 308, 310, 312 may have a signature indicating that two or more Wi-Fi networks are visible and two or more cellular transmitters are visible. These signatures may not have sufficient information for uniquely identifying the particular location labels 308, 310, 312, however they may be sufficient to identify the particular locations broadly as a restaurant.

The above has described using a signature vector of characteristics of an operating environment to determine a location label. Further, as described with regards to FIG. 3, the signature vector may not be sufficient to identify a specific location label. However, if specific labeled signatures are also associated with a physical location, location information from the device may be used to select a plurality of possible labeled signatures, and the signature vector may be sufficient to unique identify a specific location label from the possible labeled signatures. For example, a device may be able to determine its physical location using a GPS receiver to within 500 meters. The physical location could be used to retrieve a plurality of possible location labels within the possible physical location of the device. From the retrieved possible location labels, the signature vector may be used to uniquely identify the particular location label.

Although described as being provided by a GPS receiver, it is contemplated that the location information could also be provided using radio scene identification techniques. That is, a physical location may be determined based on the various wireless transmitters visible at the device. As described further below, if radio scene identification is used, it is possible to incorporate the radio scene information into the signature vector directly.

Each wireless transmitter, such as Wi-Fi radios or cellular transmitters, are associated with a unique identifier. In order to incorporate the radio scene information into the signature vector, the unique identifiers of the transmitters can be considered as individual characteristics of the operating environment that can have their value determined based on the RSSI value associated with the respective unique identifier. Considering only Wi-Fi transmitters, each transmitter may have a unique MAC address, which may be a unique 64 bit number. As such, the signature vector space would have a dimensionality of $2^{64}$ elements for each possible MAC address plus additional elements for any other additional sensors or operating environment characteristics such as the characteristics 204 described above with regards to FIG. 2. As will be appreciated, when considering each individual transmitter's MAC address as a characteristic of the operating environment, the vast majority of the approximately $2^{64}$ elements in a signature vector will be zero, since only a small number of transmitters will be visible from a device at a time.

Conceptually the signature vector incorporating the MAC addresses described above may be used the similar manner as described above for the lower dimension signature vector 204. However, it is not computationally feasible, or at least practical, to compare the signature vectors of the labelled locations to generated query signature vectors when the signature vectors have such large dimensions. As described further below, it is possible to generate a compressed signature vector of the high dimension signature vector. The technique for generating the compressed signature vector is homomorphic, and as such, signatures that are close or similar in the high dimension signature vector space will also be close or similar in the low dimension compressed signature vector space. As such, the compressed sensing signature vector may be used in place of the signature vector when identifying labelled locations as described above.

The following describes a compressed sensing signature generation technique for generating a low dimensional signature vector from data in a high dimensional space.

Compressed sensing can be used to generate a compressed vector from sparse data using a measurement. However, in applications where the sparse data has high dimensionality, the size of the required measurement matrix used in generating the compressed vector can be prohibitively large since it has dimensions proportional to the dimensionality of the sparse data. As described further herein, it is possible to generate a signature of high-dimensionality data without requiring the measurement matrix be known a priori. As such, it is possible to practically generate a compressed signature for data having a high dimensionality. The process described herein may not be considered to be compressive sensing as generally applied, since a measurement matrix that is statistically independent from the data is not used in calculating the compressed signature vector. Although not considered compressive sensing, the technique is generally based on compressive sensing techniques and as such is referred to as a compressive sensing signature, or compressed signature, herein.

A compressed signature can be generated from the signature vector described above. However, if the signature vector is a high dimensional sparse signature vector, only the non-zero elements may be used. The non-zero elements of the signature vector may be provided as key-value pairs with the key being the element index in the signature vector space and the value being the associated value of the element. A compressed signature may be generated directly from of key-value pairs using the compressing sensing signature technique.

A compressive sensing signature comprises m elements. The number of elements, m, may be determined based on the dimensionality of the data, and the expected sparsity of the data. As an example, m=32 may provide an acceptable signature in numerous application, although other signature sizes are possible such as 64, 128, 256. Each of the m elements of the compressive sensing signature is equal to a summation of one or more terms. Each of the one or more terms in the summation of an element associated with a respective key-value pair of the key-value pairs for which the compressed signature is being generated, and is equal to, or proportional to if a weighting factor is used, the value of the pair multiplied by a pseudo-random number. Each of the pseudo-random numbers used in calculating the terms of the summation is generated from a seed based on a unique value, which may be the key of the key-value pair, and a unique value associated with the element of the compressed signature being calculated, which may be the index of the compressed signature element being calculated.

Figure 4:
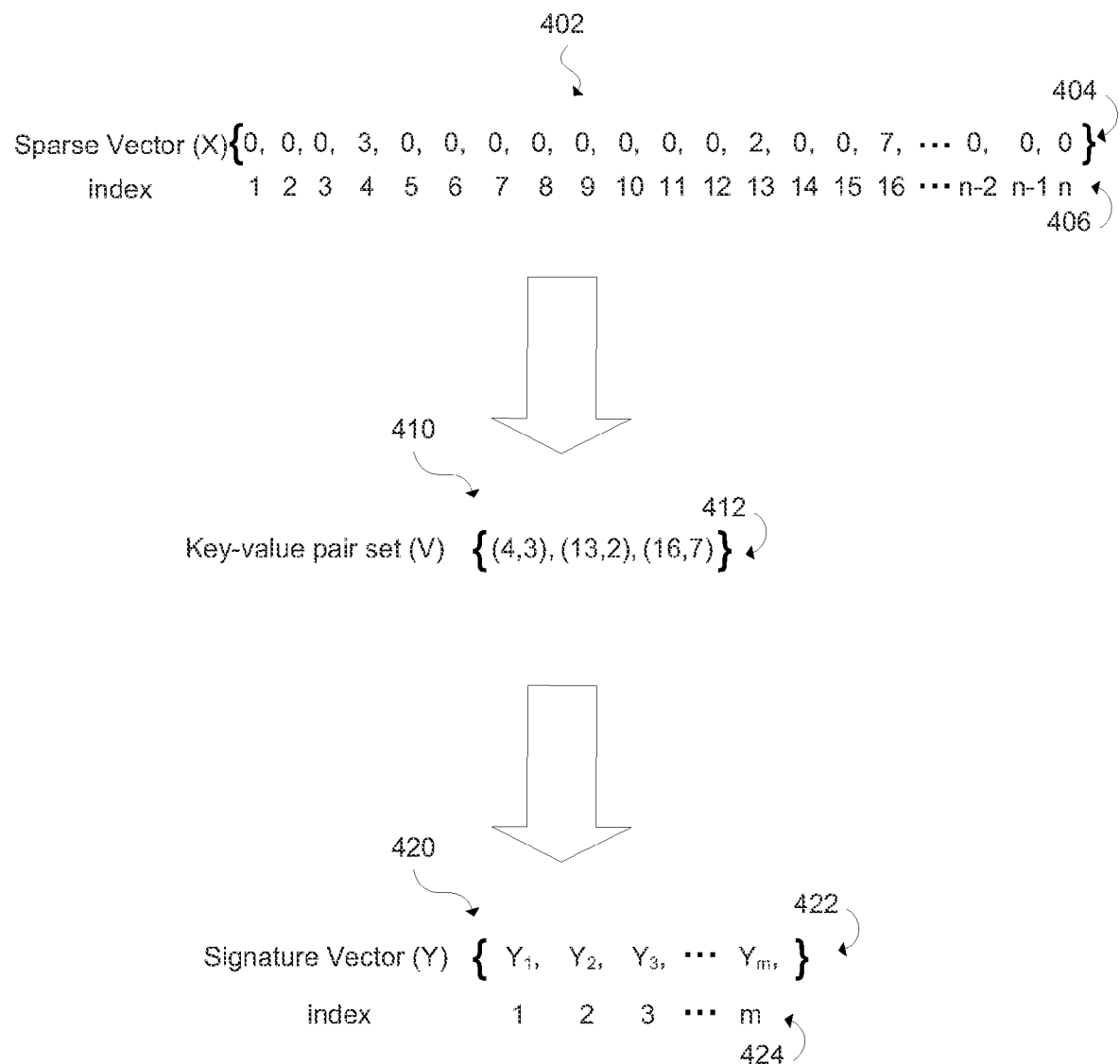
FIG. 4 depicts the various data elements in the compressive sensing signature technique as applied to data presented in the form of a vector sparse in its own domain.

FIG. 4 depicts the various data elements in the compressive sensing signature technique as applied to data presented in the form of a vector sparse in its own domain. Note, however, that the described technique depicted method remains applicable even to data that is a vector sparse under some non-trivial orthonormal transformation, or even to a vector that is not sparse at all. The data may be drawn from a signature vector space that provides an ordering of MAC addresses as well as device sensors and operating environment characteristics As depicted, there are three types of variables, namely a sparse data vector (X) 402, a set of key-value pairs (V) 410, and the compressed signature vector (Y) 420. The sparse data vector X has n elements 404, which each may be associated with a respective index 406. The sparse vector X may represent various types data, for example, X could be used to represent radio scene information and operating environment characteristic information.

The set of key-value pairs V 410 comprises key-value pairs 412 from the sparse vector X that have a non-zero value. That is, each key-value pair in V is associated with a unique operating environment characteristic having a non-zero value. The key-value pairs 412 include the non-zero elements from the sparse vector X 402. The key of the key-value pair is the index of a non-zero element of X, or some other identifier associated with the index. The associated value of the key-value pair is the value of the associated element of X. As can be seen, the number of key-value pairs in the set V is equal to the sparsity of X, that is the number of non-zero elements of the vector X, which for sparse data will be much smaller than the dimension of X.

The signature vector Y 420 comprises a number (m) of elements, with m<<n. Each element 422 of the signature vector Y is associated with an index value 424. The value of each element 422 is calculated based on the key-value pair in the set V, as opposed to the sparse vector X, as described further below.

As should be clear, an actual sparse vector X does not need to be provided to determine the key-value pair set V, since only the non-zero valued elements are used in calculating the compressed signature.

Each element of the signature vector Y can be directly calculated from the set of key-value pairs V, without requiring the large measurement matrix be known a priori. If the sparse vector X has s(X) non-zero elements, then the set of key-value pairs V provides a list of s(X) key-value pairs of the form (key K, value P). Since the sparsity of X may vary in different realizations of X, the number of key-value pairs in the set V is described as a function of X, namely s(X). Each element of the signature vector may be directly calculated as:

$$Y_i = \sum_{l=1}^{s(X)} R(f(i, K_l)) \cdot P_l \cdot G(K_l) \qquad (1)$$

In (1) above, $K_l$ is the key of the $l^{th}$ element's key-value pair in the set V and $P_l$ is the associated value of the $l^{th}$ key-value pair in the set V. $R(f(i,K_l))$ is a value returned from a unit normal ($N(0,1)$) pseudo-random number generator using a seed of $f(i,K_l)$. It is noted that the pseudo-random number generator will generate the same value when given the same seed value. The function $f(\bullet)$ may be a hash function of the tuple $(i,K_l)$, such as:

$$f(i,K_l)=hash(str(i)+str(K_l)) \qquad (2)$$

In (2) above str(•) and hash(•) may be common functions for generating a string from a variable, and generating a hash from a string respectively. Further the '+' operator may be the concatenation of strings.

The function $G(K_l)$ in (1) above provides an additional gain function, which may be used to provided flexibility, for example by providing flexibility in deprecating certain elements in the key-value pair set V.

From (1) above, it can be seen that each individual element of the compressed signature vector Y is calculated as a summation of terms, with each term of the summation calculated from the value of a respective key-value pair multiplied by a pseudorandom number generated based on the key associated with the respective value and a unique value associated with the respective element of the compressed signature vector being calculated. As depicted above in (1), the unique value associated with the respective element of the compressed signature vector being calculated may be provided by the index of the element being calculated, however other values are possible.

From the above, it is clear that the calculation of the compressed sensing signature vector Y is done without requiring the generation of the measurement matrix Φ, whose size is proportional to the dimensionality of the sparse vector X, which may be extremely large. As such, the large storage requirements for calculating the compressed sensing signature vector are eliminated. Further, the calculation of the compressed sensing signature vector only involves non-zero data, and hence unnecessary multiplication, i.e. multiplication by zero, and calls to the random number generator are avoided, thereby reducing the computational complexity of generating the compressive sensing signature.

Strictly speaking equation (1) above is not an exact implementation of the compressive sensing since the normal variables provided by the pseudo-random number generator are not completely independent of the data as is the case of the measurement matrix Φ. However, given the benefits of the approach described by (1), any dependence of the normal variables on the data may be acceptable. Further the dependency is only via the seed, and hence results in only very low level long range correlations that may be virtually undetectable when using an adequate pseudo-random number generator.

Figure 5:
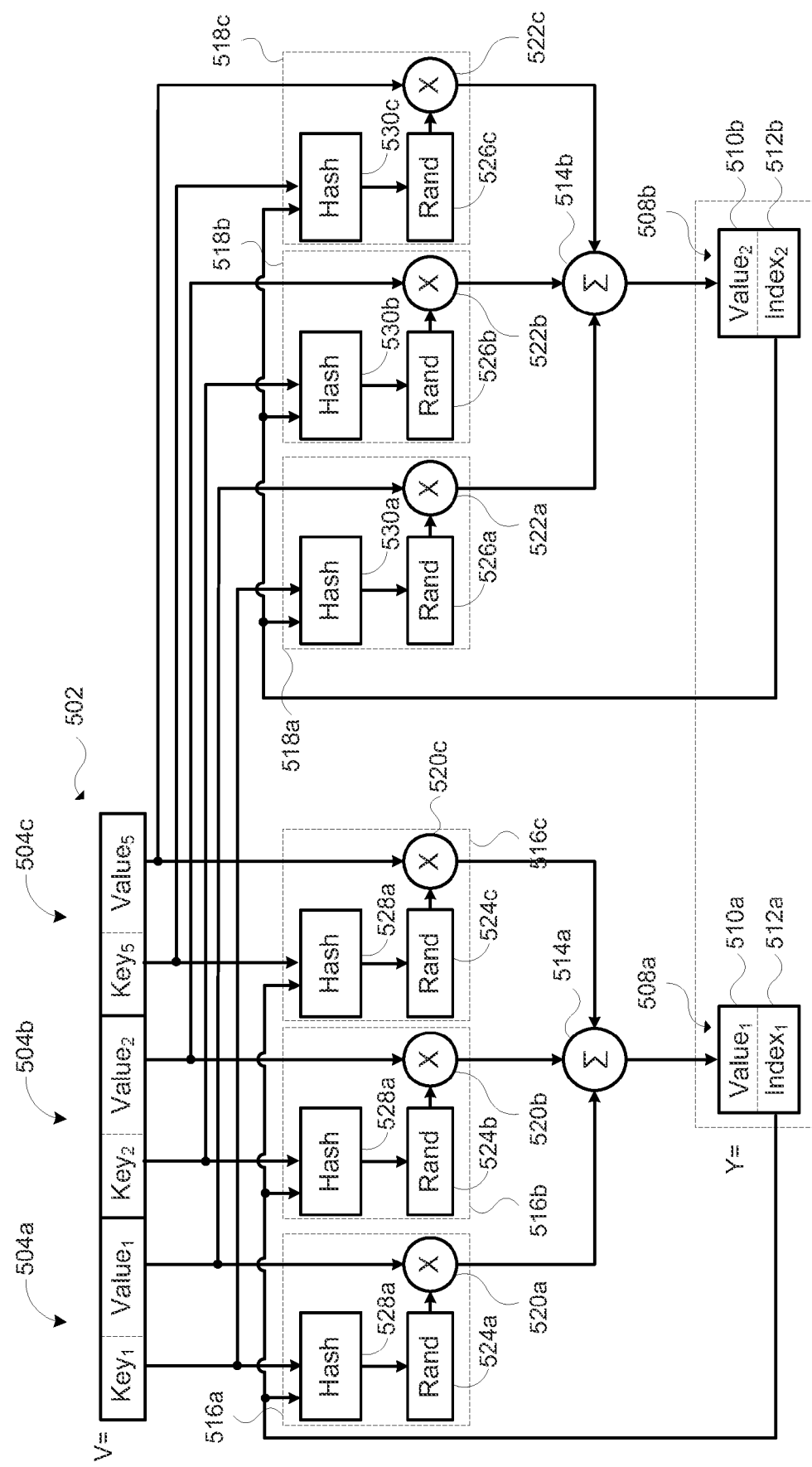
FIG. 5 depicts generating a compressed sensing signature vector.

FIG. 5 depicts generating a compressed sensing signature vector. FIG. 5 depicts calculating a compressed sensing signature vector having two elements. It is contemplated that the length of the signature may vary depending upon the application. Different applications may have different dimensions of the sparse vector, as well as different expected sparsities of the data and different probabilities of the possible data. Although different lengths of signatures are possible, a signature of 32 elements may be used as a default size, which is suitable for many applications. As described above, each element of the compressed sensing vector is calculated in the same manner, regardless of if the signature vector has two elements, 32 elements or more.

As depicted in FIG. 5, the key-value pair set V 502 has three elements 504a, 504b, 504c of respective key-value pairs. The compressed sensing signature vector Y 506 is depicted as having two elements 508a, 508b each having a value 510a, 510b and associated index value 512a, 512b.

As is clear from FIG. 5, each value 510a, 510b is calculated as a summation 514a, 514b, of a plurality of terms 516a, 516b, 516c and 518a, 518b, 518c respectively. The number of terms in each summation 514a, 514b is equal to the number of key-value pairs, including repeated keys, in the set V. Each term 516a, 516b, 516c, 518a, 518b, 518c used in the summation may be calculated as a multiplication 520a, 520b, 520c, 522a, 522b, 522c of a respective value of the respective key-value pair 304a, 504b, 504c of the set V and a random number 524a, 524b, 524c, 526a, 526b, 526c generated from a pseudo-random number generator. The pseudo-random number generator may generate each of the random numbers 524a, 524b, 524c, 526a, 526b, 526c using a respective seed value. Each of the seed values 528a, 528b, 528c, 530a, 530b, 530c may be generated from the key of the respective key-value pairs 504a, 504b, 504c of the set V and the respective index 512a, 512b, or unique identifier, of the element of the compressed sensing signature vector being calculated.

The process of FIG. 5 is intended to clarify the conceptual generation of the compressed sensing signature vector, and it should be appreciated that other processes for the generation are possible. For example, each term used in the summation is depicted as being calculated in parallel; however, it is contemplated that the terms could be calculated sequentially. Further, the multiplication of the random numbers by the respective values could be accomplished by adding the random numbers together a respective number of times based on the value.

Figure 6:
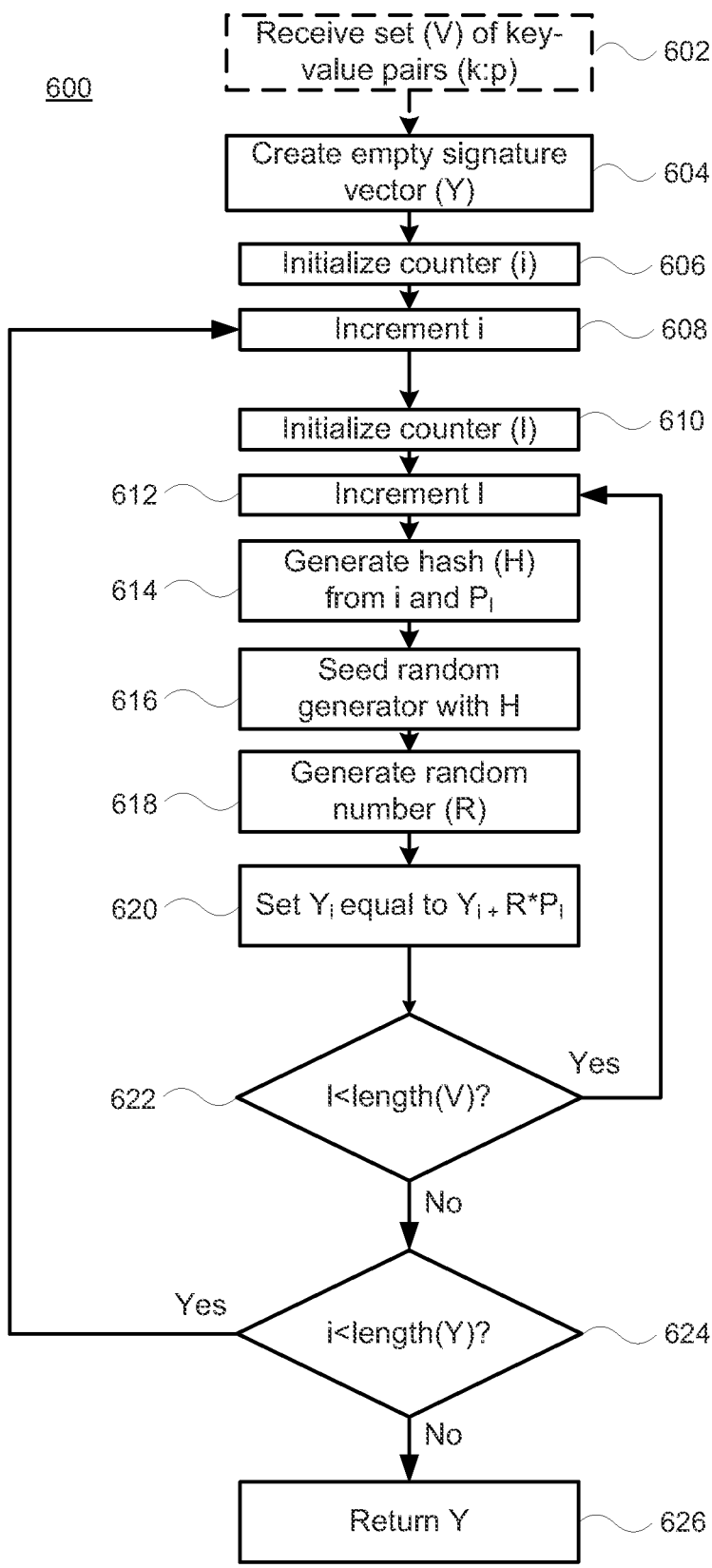
FIG. 6 depicts a method of generating a compressed sensing signature.

FIG. 6 depicts a method of generating a compressed sensing signature. The method 600 may be used to generate a compressed sensing signature from a set of key-value pairs V. The set of key-value pairs V comprising one or more key-value pairs may be received (602), which may include retrieving the data for example from a storage device. The set V has n elements, where n>=1. The method 600 creates an empty compressed signature vector (Y) of m elements (604). The empty compressed signature vector Y has m zero-valued elements. The method initializes a first counter (i) (606). The counter (i) is used to loop over each element in the compressed signature vector Y and calculate the element's value. Once the counter is initialized, it is incremented (608). It is noted that in the method 600 the counter (i) is initialized to one less than the first index of the compressed signature vector Y so that when it is incremented, the first element of the compressed signature vector Y will be referenced. Further, it is noted that the initialization and incrementing of the counter (i) may be done implicitly, for example by using a 'for-next' loop, or other programmatic means. Once the first counter (i) is initialized/incremented, a second counter (j) is similarly initialized (610) and incremented (612). The second counter (j) is used to loop over each element in the set V to calculate the summation terms from the key-value pairs of the set V elements.

Once the second counter (l) is initialized/incremented a hash (H) is generated from the concatenation of the value of the first counter (i) and the key of the $l^{th}$ key-value pair of the set V (614). Once the hash (H) is calculated, it is used as the seed for a random number generator (616), and a random number (R) is generated from the seeded random number generator (618). Once the random number (R) is generated, the $i^{th}$ element of the signature vector V, which was initialized to zero, is set equal to $Y_i + R * P_l$, where $P_l$ is the value of the $l^{th}$ key-value pair of the set V (620). Once the terms have been summed, it is determined if the second counter (j) is less than the number of key-value pairs in the set V (622). If the counter (l) is less than the number of elements in the set V (Yes at 622), there are further elements in the set V to use in calculating the element in the compressed signature vector Y and the method returns to increment the second counter (l) and proceeds to incorporate the next key-value pair from the set V in the calculation of $Y_i$. If the counter (l) is not less than the number of elements (No at 622), than there are no more key-value pairs in the set V to use in calculating $Y_i$ and the method determines if the first counter (i) is less than the number of elements in the compressed signature vector Y (624). If the counter (i) is less than the number of elements in the compressed signature vector Y (Yes at 624), then there are further elements of the signature vector Y to calculate and the method increments the first counter (i) (610) and calculates the value of the next element of the compressed signature vector Y. If the first counter (i) is not less than the number of elements in the compressed signature vector Y (No at 624), then all of the elements of the compressed signature vector Y have been calculated and the compressed signature vector Y is returned (626).

The method 600 described above may generate a compressed sensing signature vector from a set of key-value pairs representative of sparse data, which could be non-zero values of operating environment characteristics of a device.

Figure 7:
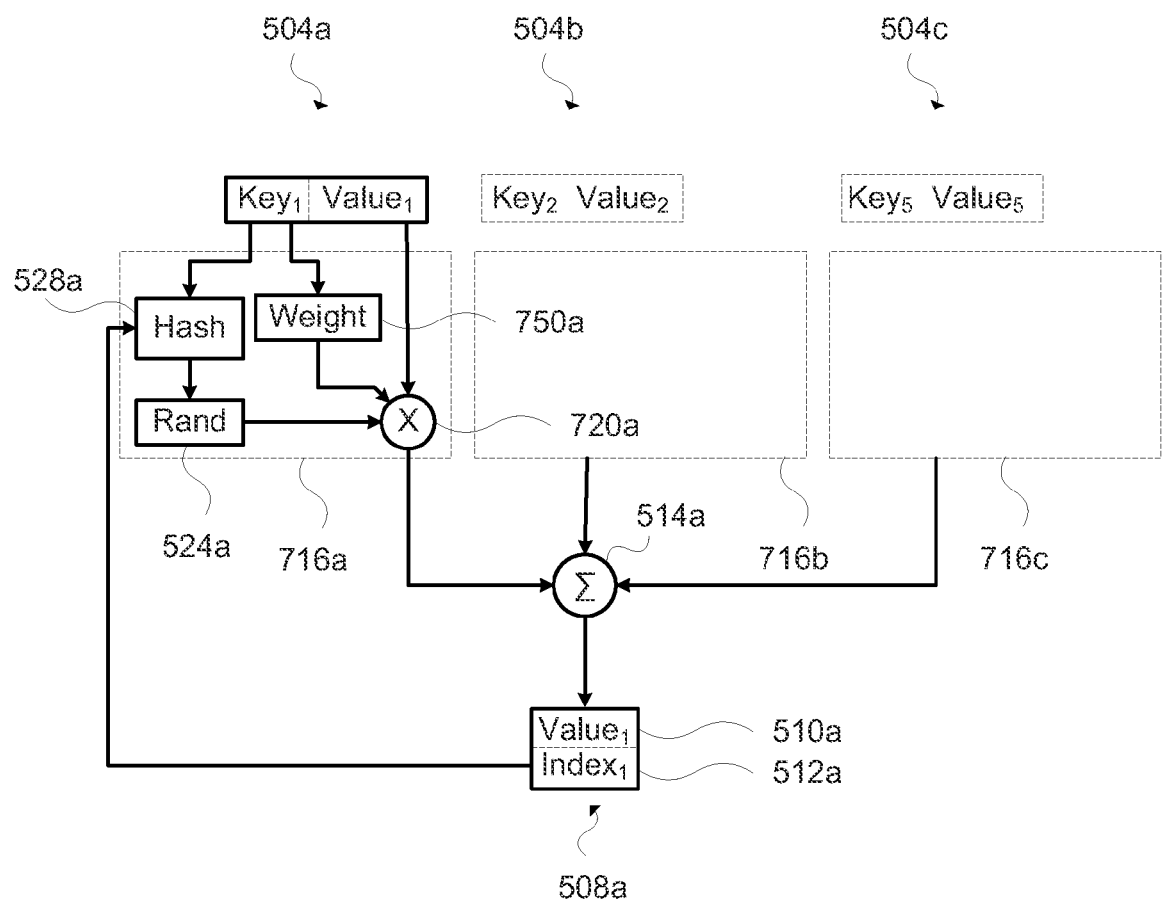
FIG. 7 depicts generating a compressed sensing signature vector.

FIG. 7 depicts generating a compressed sensing signature vector. The process depicted in FIG. 7 is substantially similar to that described above with regards to FIG. 5 however, the calculation of each of the terms 716*a*, 716*b*, 716*c* used in the summation 514*a*, includes a weighting term 750*a* (depicted for term 716*a* only). FIG. 7 only depicts the details for the calculation of a single term 716*a* used in the summation 514*a* for a single element 508*a* in the signature vector. The calculation of the other terms 716*b*, 716*c* may also include a similar weighting term.

As depicted in FIG. 7, the term 716*a* used in the summation 514*a* is equal to a multiplication 720*a* of the random number 524*a*, the value of the key-value pair 504*a* in the set V and a weighting term 750*a*. The weighting term 750*a* may be used to provide a means of providing more relevant terms. For example, if the set of key-value pairs is used values of operating environment characteristics, the weighting term 750*a* may be provide an indication of which operating environment characteristics are important for identifying an associated location label. The weighting terms may be provided by a weighting mask, which may be a vector of the weighting terms.

From the above, one or more operating environment characteristics can be weighted to have greater or lesser importance in the generated compressed signature. As will be appreciated, certain operating environment characteristics may be more important than others in distinguishing a location label. For example, if the location label to be determined is a label indicating that the user is in their automobile, position information, such as RSSI values received from particular MAC addresses may be irrelevant since the automobile can be in different geographic locations. As such, a weighting mask for generating a compressed signature that may be used in determining the 'Car' location label may provide a zero weighting to location information, such as the MAC addresses of visible Wi-Fi transmitters.

When location labels are stored at a server, a larger number of users may submit signature information, namely key-value pairs of operating environment characteristics, and associated location label information. When the signature information is received, the server may generate a corresponding compressed sensing signature from the signature information. However, as described above, different types of locations may be best identified using compressed signatures that incorporate different weightings of the operating environment characteristics. When a user submits the signature information associated with a location label, the server may retrieve a weighting mask associated with the location label or type of location label and generate a compressed signature from the signature information and weighting mask that can then be associated with the location label. As described above, location labels may be arranged in a hierarchy, such as restaurant→restaurant type→specific restaurant name. Each location label in the hierarchy may be associated with an appropriate weighting mask and when the signature information is received, one or more compressed signatures may be generated and associated with location labels from the hierarchy information.

As a large corpus of information is built, it may be possible to identify operating environment characteristics that are useful in identify a location label. A large corpus of signature information and associated location labels may be processed in order to identify operating environment characteristics useful in identifying the location label. That is, a corpus of signature information and associated location labels may be processed in order to determine weighting masks for various location labels. The signature information, namely the key-value pairs of operating environment characteristic values from devices, of similar location labels may be processed to identify the operating environment characteristics that can be used to identify the particular location label. The processing of the received signature information may be based on machine learning techniques or other processing techniques that can identify common characteristics of a group of location labels. Once the useful operating environment characteristics have been identified for a particular location label, the weighting mask can be stored.

When a user wishes to determine a location label from signature information, one or more weighting masks can be determined and compressed signatures generated from the signature information and the associated weighting masks. The weighting masks to use in generating the compressed signatures may be determined in various ways. For example, the user may provide an indication of the types of location labels they are interested in, and the associated weighting masks of location labels associated with the types of locations in a label hierarchy may be used to generate the compressed signatures. Alternatively, a compressed signature may be generated using each possible weighting mask from the corpus of location labels. Further, the compressed signatures may be generated at the portable electronic device, or at the server. If the compressed signature is generated at the device, the device may request, or otherwise receive, one or more weighting masks to use in generating one or more compressed signatures used.

Figure 8:
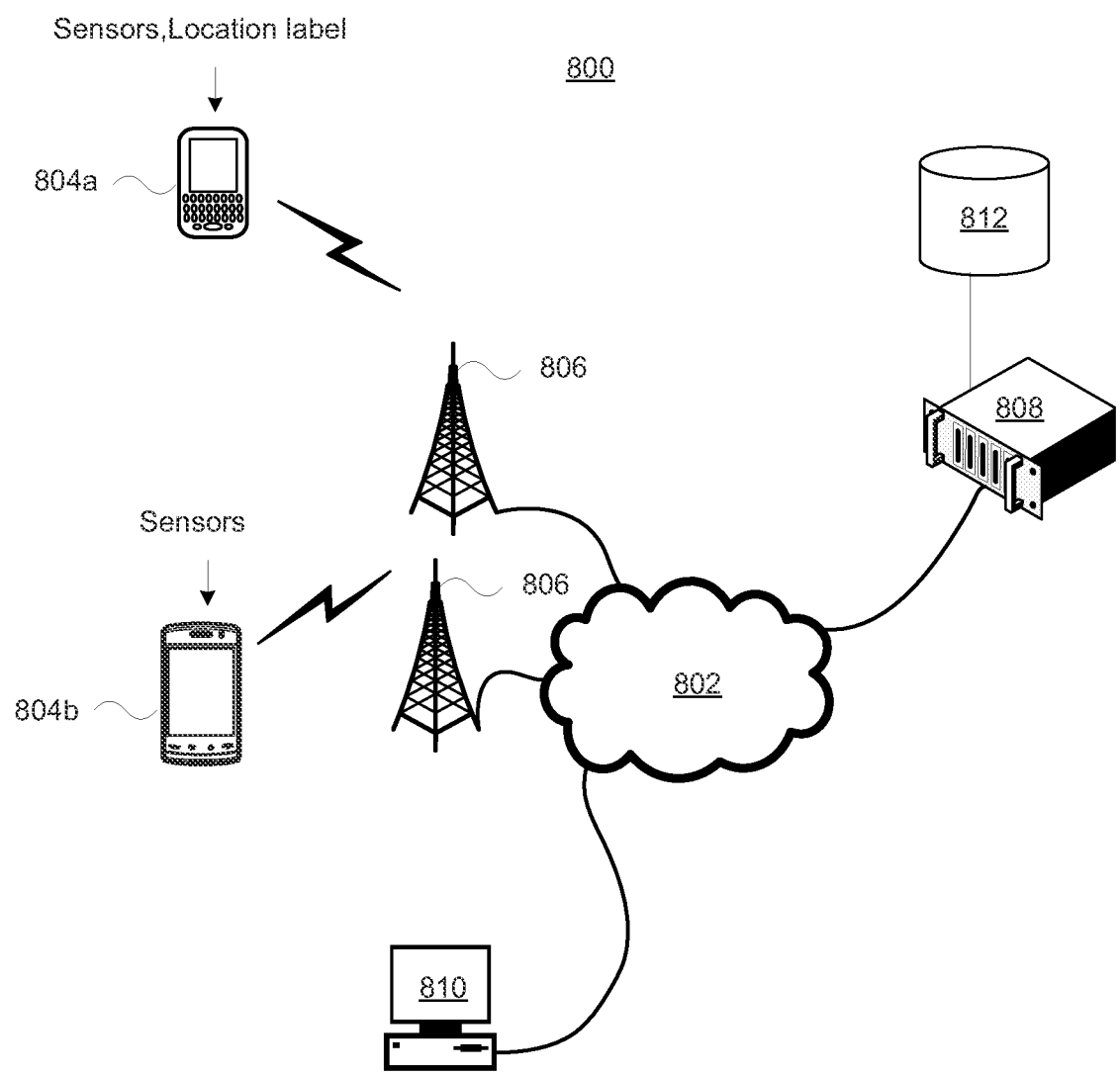
FIG. 8 depicts an environment in which determining a location label from a signature vector may be used.

FIG. 8 depicts an environment in which determining a location label from a signature vector may be used. The environment 800 comprises a network 802 connecting a plurality of devices together. The devices may include for example one or more portable electronic devices 804a, 804b, that are connected to the network 802 through a cellular infrastructure 806. The devices may further comprise one or more servers 808 connected to the network. The devices may further comprise one or more personal computers 810 connected to the network 802. The one or more server 808 may access a location label corpus 812. The location label corpus may store signature information and associated location labels received from devices as well as weighting masks as well as compressed signatures of the signature information generated using the weighting masks. It will be appreciated that the environment 800 is a simplified illustration of the possible devices, and other devices and/or components may be included in the environment. One or more of the devices 804a, 804b may submit key-value pairs of operating environment characteristics and an associated location label to the server. The location label can be provided as an index into a hierarchy structure providing a plurality of possible location labels. Alternatively the location label may be provided as a string.

One or more of the devices 804a, 804b may submit key-value pairs of operating environment characteristics, or corresponding compressed signatures, to the server 808 as a query for a location label. The generated compressed signatures may be used to determine similar or close compressed signatures stored in the database 812. The comparison between two signatures may be provided by the Euclidean distance between the two, which captures "difference" between the two signatures. Alternatively, the comparison may be made using the standard Inner Product, which captures the similarity between the two signatures. There usually are efficient math libraries for determining either the Euclidean distance or the inner product. However, it may be necessary to compare a candidate signature with a large number of pre-recorded signature vectors. Hence, it is desirable to use some computationally efficient way for finding the closest signature from a corpus of signatures, given some candidate signature. One illustrative way to do this is to first construct a vantage point tree (VP Tree) data structure from the corpus of signatures. Suppose the corpus had W signatures in it, where W can be a very large number, for example corresponding to hundreds of thousands of emails or documents, or millions of recorded radio scenes. The computational cost of construction of the VP Tree is O(W). Then when a candidate signature, for example from a document or radio scene is presented, the VP Tree can return the nearest K neighbors from the corpus of signatures, with a computational cost that is only O(K log W), which may be acceptable cheap since it is independent of W.

It is noted that the above described method of comparing two signatures is only one possible method of using the signatures. For example, a plurality of signatures may be formed into clusters to group similar information together. A search signature may then be used to determine the closest cluster and return the information associated with the determined cluster. A location label of the similar or close compressed signatures may be provided to the device or system in response to the query. As the corpus of signatures grows the server 808 may utilize machine learning techniques to group or identify labels based upon similar signatures and learn which of the characteristics which compose a signature are unique in any given environment and use the is information to later infer locations.

The compressed sensing signatures described above can be used to generate signatures of sparse data having very large dimensions. The compressed signatures are universal, in that they do not depend on any structural properties, other than the sparsity, of the data, unlike other methods such as multi-dimensional scaling which need to do principal component analysis of the data. Further, the compressed signatures described herein are simple to compute and do not require a large memory footprint to store a large measurement matrix as required by standard compressed sensing. As such, the calculation of the compressed sensing signatures is possible on many devices, including portable electronic devices such as smart phones, even for sparse data having large dimensionality.

The compressive sensing signatures described herein are also approximately homomorphic. That is, distances between data are preserved. That is, if the sparse data is considered a vector, then two vectors of sparse data that are close, will have compressed sensing signatures that are close. As such, the compressed signatures may be used directly for comparison purposes, without having to reconstruct the original sparse data.

The above has described the use of a signature vector of operating environment characteristic values at a device in determining a location label of the device. If only a relatively small number of operating environment characteristics are included in the signature vector, it is possible to use the signature vector directly. However, if a large number of operating environment characteristic values are included in the signature vector space, for example by including RSSI values received from visible wireless transmitters, most of which will be zero-valued, than a compressed signature of the signature vector, or non-zero key-value pairs of the signature vector, may be used instead of the signature vector.

A further advantage of using a compressed signature instead of the signature vector directly, is that operating environment characteristics can be added to the signature vector space, without requiring that all of the compressed signatures be recreated to incorporate the new characteristics. The existing compressed signatures will simply have a weighting of zero associated with the new operating environment characteristic. In contrast, if the signature vector is used directly, and a new operating environment characteristic is added, all of the existing signature vectors would need to be updated to add a corresponding element.

Figure 9:
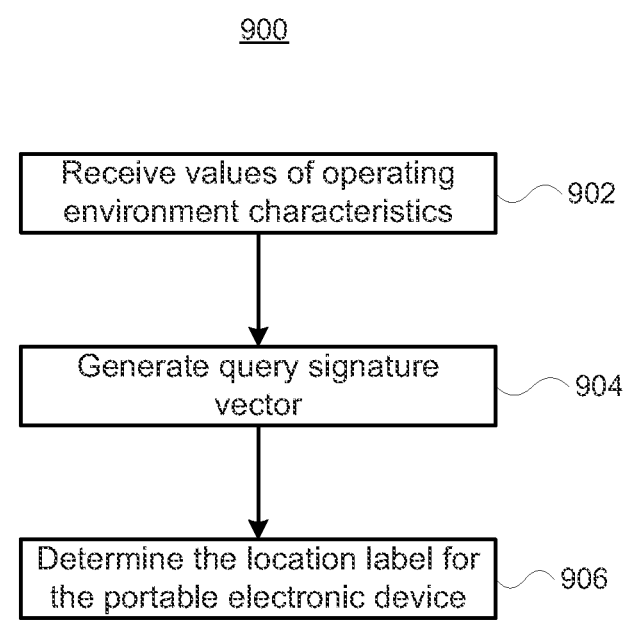
FIG. 9 depicts a method of identifying a labelled location of a portable electronic device.

FIG. 9 depicts a method of identifying a location label of a portable electronic device. The method 900 receives values of a plurality of characteristics of an operating environment of a portable electronic device (902). Each of the plurality of characteristics of the operating environment are associated with a respective pre-determined identifier within a vector space. The plurality of received values may be received a server from a portable electronic device. The server may have access to a corpus of location labels, each associating a signature vector, or a compressed signature vector with a location label.

As previously described, the vector space provides an ordering of a plurality of characteristics of an operating environment. The vector space may provide a large number of possible characteristics of the operating environment; however, not all of the characteristics need to have a value associated with it. Different devices may be able to provide values for different characteristics. As such, not all devices need to be able to provide values for all possible characteristics.

Once the values of the operating environment characteristics have been received, a query signature vector is generated (904). If the vector space is of a low dimension, the signature vector may be generated as a direct vector representation of the received values. If however the vector space is a high dimensional space, a compressed signature vector may be generated from the received values using a compressed sensing signature technique. In method 900, it is assumed that the values of the operating environment characteristics are received at the server from the portable electronic device, and as such, the query signature vector is assumed to be generated at the server. It is contemplated that the query signature vector could be generated at the portable electronic device and received at the server. The query signature vector is generated from pairs of a respective pre-determined unique identifier associated with each one of the plurality of characteristics of the operating environment and the determined value of the operating environment characteristic of the respective pre-determined unique identifier. The generation of the signature vector may also comprise retrieving weighting information providing an indication of importance of one or more of the operating environment characteristic values to be used in generating the signature vector.

Once a query signature vector is available, either being received from the portable electronic device or being generated at the server, a location label for the portable electronic device can be determined (906). The location label for the portable electronic device may be determined based one or more signature vectors stored in a corpus that are each is associated with a respective location label. The one or more signature vectors to use in determining the location label may be based on a similarity between the query signature vector and the respective signature vector. For example, the location label may be determined as the location label associated with the signature vector that is the closest to the query signature vector.

The determination of the location label for the portable electronic device may also be based on a physical position of the portable electronic device where the location label for the portable electronic device based on the similarity of the generated signature vector to one or more signature vectors.

Figure 10:
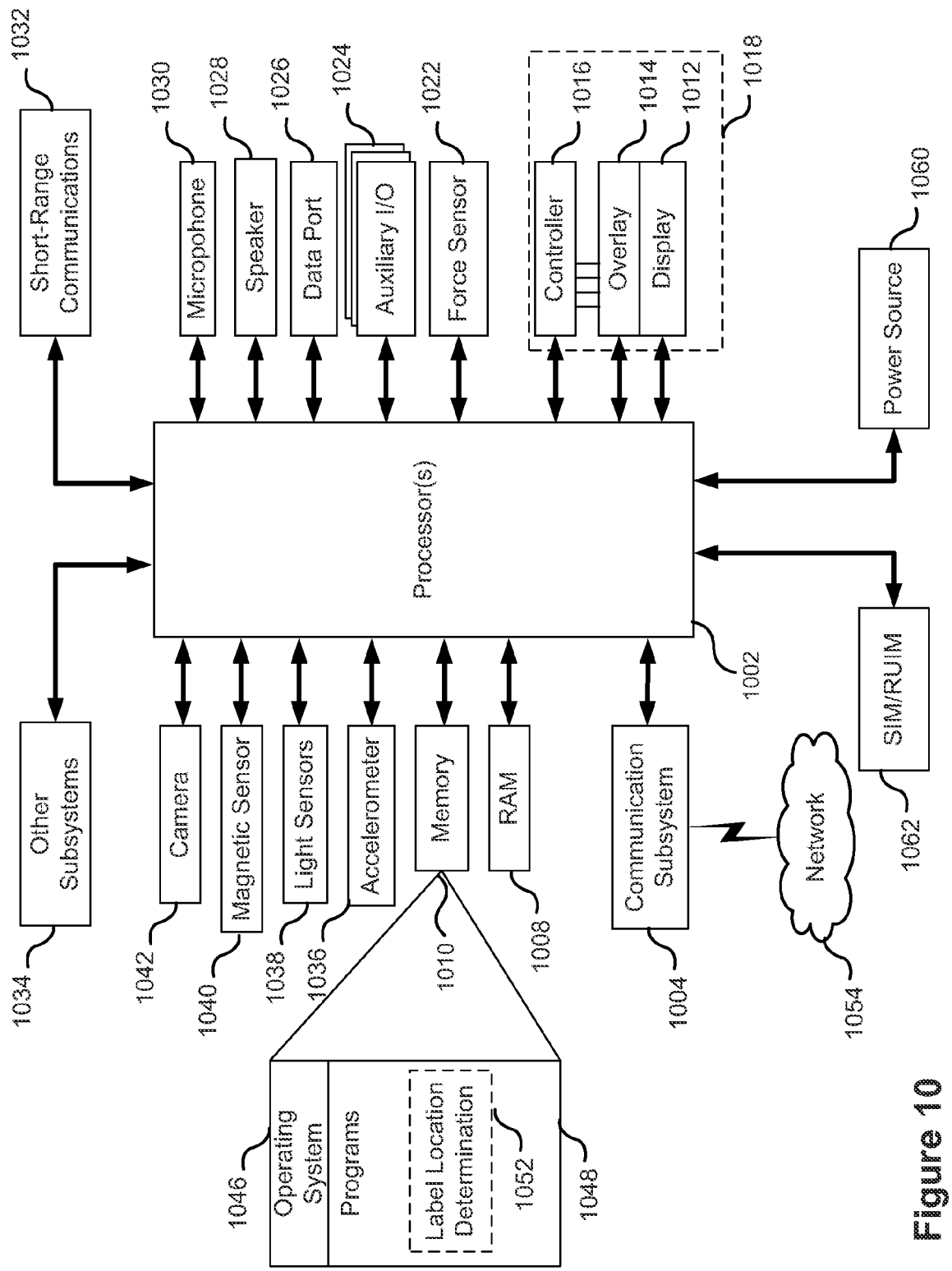
FIG. 10 show a block diagram of an electronic device in accordance with an illustrative embodiment.

FIG. 10 show a block diagram of an electronic device 1000 in accordance with an illustrative embodiment. A processor 1002, a multiple core processor or multiple processors may interface with component or modules of the electronic device to provide functionality required. A touch-sensitive interface is provided by a touch-sensitive display 1018, having a controller 1016, overlay 1014 for receiving input and display 1012 coupled to the processor 1002. The touch-sensitive display 1018 may be any suitable touch-sensitive display, such as a capacitive, resistive, infrared, dispersive signal, acoustic pulse recognition, optical imaging, surface acoustic wave (SAW). In the presently described example embodiment, the touch-sensitive display 1018 is a capacitive touch-sensitive display which includes a capacitive touch-sensitive overlay 1014. The overlay 1014 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). The portable electronic device is powered by a power source 1060 such an a removable or integrated battery.

The processor 1002 interfaces with memory 1010 providing an operating system 1046 and programs or applications 1048, including location label determination functionality 1052, instructions for execution by the processor 1002. Random access memory 1008 is provided for the execution of the instructions and for processing data to be sent to or received from various components of the electronic device. The instructions when executed by the processor 1002 may configure the electronic device to provide various functionality for transferring data. The functionality may include location label determination functionality 1052 described herein. For example, the functionality may include functionality for determining values of a plurality of operating environment characteristics and functionality for querying a server and receiving the location label determined by the server.

Various input/out devices or sensors may be provided such as an accelerometer 1036, light and/or infrared sensors 1038, magnetic sensor 1040 such as a Hall Effect sensor, and one or more cameras 1042 which may be used for determining environmental characteristics. A communication subsystem 1004 is provided for enabling data to be sent or received with a local area network 1054 or wide area network utilizing different physical layer and access technology implementations.

Additional sensors are possible including but not limited to, accelerometers, infrared sensors, radar sensors, RF receivers Global Navigation Satellite System (GNSS) receivers, chemical detectors, humidity sensors, microphones, as well as other possible devices. Any type of sensor that can be integrated in a portable electronic device and can provide output data or values to define a characteristics can be utilized. The device may be able to determine values associated with a plurality of operating environment characteristics, which may include reading a sensor's value. Additionally or alternatively, the portable electronic device, or a remote server, may provide values of one or more operating environment characteristics of the portable electronic device. The operating environment characteristics may include one or more of sensor values, indication of applications or processes executing on the portable device, a state of an application or process executing on a device, information associated with an application or process executing on the device or information provided from an external device or server. For example the operating environment characteristics may include whether an email program is executing, a number of unread emails, an indication of a type of music being listened to, or other characteristics of the operating environment.

A subscriber identity module or removable user identity module 1062 may be provided depending on the requirement of the particular network access technology to provide user access or identify information. Short-range communications 1032 may also be provided and may include near-field communication (NFC), radio frequency identifier (RFID), Bluetooth technologies which may also be utilized to determine environmental characteristics or identifiers. The electronic device may also be provided with a data port 1026 and auxiliary input/output interface 1024 for sending and receiving data. A microphone 1030 and speaker 1028 may also be provided to enable audio communications via the electronic device 100.

FIG. 11 depicts a computing device for determining a location label of a portable electronic device. The computing device 1100 may be used as server 808. The device 1100 comprises a processor 1102 for executing instructions 1104 stored in a memory 1106. The instructions may include instructions for providing functionality for determining a location label 1108 as described above. The functionality may include functionality for receiving a query signature vector or a compressed query signature vector. Additionally or alternatively, the functionality may include functionality for generating the query signature vector or compressed query signature vector from receive key-value pairs of operating environment characteristics. The functionality may further comprise functionality for determining a weighting mask for a location label based on a plurality of key-value pairs associated with the location label. The functionality may further comprise functionality for determining and returning a location label from a query signature vector or a compressed query signature vector. The computing device 1100 may include one or more input/output (I/O) interfaces 1110 which may include a network adapter for connecting the device 1100 to a network 1112. The computing device 1100 may also provide the location label to the portable electronic device or provide the label to location based services coupled to the network which would then provide instructions or data to the portable electronic device based upon the determined location label.

The above has referred to 64-bit MAC addresses as being used for generating the compressed sensing signature. It is noted that 48-bit MAC address are also commonly used. It is possible to generate a compressed sensing signature using both 64-bit and 48-bit addresses. One technique is to convert the 48-bit MAC address into a 64-bit MAC address. A 64-bit MAC address can be generated from a 48-bit MAC address by inserting two defined padding bytes, namely "FF" and "FE" in hexadecimal, between the first three bytes, which may form the organizationally unique identifier (OUI) and the last three bytes, which may provide an identifier that is uniquely assigned by the manufacturer. As such, a 48-bit MAC address of AC-DE-48-23-45-67 can be converted to the 64-bit MAC address AC:DE:48:FF:FE:23:45:67. The compressed sensing signature may generated from the 64-bit address, regardless of if it is a 64-bit MAC address or a padded 48-bit MAC address.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of identifying a location label of a portable electronic device, the method comprising:
receiving values of a plurality of characteristics of an operating environment of the portable electronic device, each of the plurality of characteristics of the operating environment associated with a respective pre-determined unique identifier;
generating a compressed query signature vector from a query signature vector comprising a plurality of key-value pairs, each key-value pair comprising: i) a respective pre-determined unique identifier associated with a corresponding one of the plurality of characteristics of the operating environment and ii) a value for the received characteristic of the operating environment corresponding to the respective pre-determined unique identifier; and
determining the location label for the portable electronic device by comparing the compressed query signature vector to one or more labeled signature vectors that are similar to the compressed query signature vector, each labeled signature vector comprising a previously generated signature vector and associated with a respective location label.

2. The method of claim 1, wherein generating the compressed query signature vector further comprises:
retrieving weighting information providing an indication of importance of one or more of the plurality of characteristics of the operating environment; and
generating the compressed query signature vector using the weighting information.

3. The method of claim 1, wherein determining the location label further comprises:
determining a position of the portable electronic device;
determining a plurality of possible labeled signature vectors of the portable electronic device based on a physical position of the portable electronic device; and
determining the location label for the portable electronic device based on the similarity of the generated compressed query signature vector to one or more previously generated signature vectors of the determined plurality of possible labeled signature vectors.

4. The method of claim 1, wherein the compressed query signature vector is generated based on a weighting mask providing an indication of importance of one or more of the plurality of characteristics of the operating environment in the compressed query signature vector.

5. The method of claim 4, wherein the weighting mask is associated with a location label.

6. The method of claim 5, further comprising:
retrieving a plurality of weighting masks associated with respective location labels;
determining a respective compressed query signature vector as a compressed signature vector from the values of the plurality of characteristics of the operating environment and a respective weighting mask of the retrieved weighting masks; and
determining one or more location labels based on the plurality of compressed query signature vectors.

7. The method of claim 6, further comprising:
determining a likelihood of correctness of each of the determined one or more location labels based on a distance between each respective compressed query signature vector and the associated determined one or more location labels.

8. The method of claim 1, wherein each vector element in the compressed query signature vector is generated based on each respective key-value pair in the plurality of key-value pairs.

9. The method of claim 8, wherein each vector element in the compressed query signature vector is generated as a summation of terms based on each of the key-value pairs of the query signature vector, wherein each of the terms in the summation is determined based on a multiplication of a random number generated from a seed based on an element identifier of the compressed signature vector being calculated and the key of the key-value pair associated with that respective term in the summation.

10. The method of claim 1, wherein the plurality of characteristics of the operating environment of the portable electronic device comprise output from one or more of:
a temperature sensor;
a gyroscope;
an accelerometer;
a microphone;
a magnetometer;
a light sensor;
a radio frequency identification (RFID) reader;
a near-field communications interface;
an application executing on the portable electronic device;
reception quality of a wireless receiver;
a global positioning receiver; and
a wireless radio.

11. A server for identifying a location label of a portable electronic device, the server comprising:
a memory containing instructions; and
a processor for executing instructions, the instructions when executed by the processor configuring the server to provide functionality for:
receiving values of a plurality of characteristics of an operating environment of a portable electronic device, each of the plurality of characteristics of the operating environment associated with a respective pre-determined unique identifier;
generating a compressed query signature vector from a query signature vector comprising a plurality of key-value pairs, each key-value pair comprising: i) a respective pre-determined unique identifier associated with a corresponding one of the plurality of characteristics of the operating environment and ii) a value for the received characteristic of the operating environment corresponding to the respective pre-determined unique identifier; and
determining the location label for the portable electronic device by comparing the compressed query signature vector to one or more labeled signature vectors that are similar to the compressed query signature vector, each labeled signature vector comprising a previously generated signature vector and associated with a respective location label.

12. The server of claim 11, wherein generating the compressed query signature further comprises:
retrieving weighting information providing an indication of importance of one or more of the plurality of characteristics of the operating environment; and
generating the compressed query signature vector using the weighting information.

13. The server of claim 11, determining the location label further comprises:
determining a position of the portable electronic device;
determining a plurality of possible labeled signature vectors, of the portable electronic device based on a physical position of the portable electronic device; and
determining the location label for the portable electronic device based on the similarity of the generated compressed query signature vector to one or more previously generated signature vectors of the determined plurality of possible labeled signature vectors.

14. The server of claim 11, wherein the compressed query signature vector is generated based on a weighting mask providing an indication of importance of one or more of the plurality of characteristics of the operating environment in the compressed query signature vector.

15. The server of claim 14, wherein the weighting mask is associated with a location label.

16. The server of claim 15, wherein the instructions further configure the server to provide functionality for:
retrieving a plurality of weighting masks associated with respective location label;
determining a respective compressed query signature vector as a compressed signature vector from the values of the plurality of characteristics of the operating environment and a respective weighting mask of the retrieved weighting masks; and
determining one or more location labels based on the plurality of compressed query signature vectors.

17. The server of claim 16, wherein the instructions further configure the server to provide functionality for:
determining a likelihood of correctness of each of the determined one or more location labels based on a distance between each respective compressed query signature vector and the associated determined one or more location labels.

18. The server of claim 11, wherein each vector element in the compressed query signature vector is generated based on each respective key-value pair in the plurality of key-value pairs.

19. The server of claim 18, wherein each vector element in the compressed query signature vector is generated as a summation of terms based on each of the key-value pairs of the query signature vector, wherein each of the terms in the summation is determined based on a multiplication of a random number generated from a seed based on an element identifier of the compressed signature vector being calculated and the key of the key-value pair associated with that respective term in the summation.

20. The server of claim 11, wherein the plurality of characteristics of the operating environment of the portable electronic device comprise output from one or more of:
a temperature sensor;
a gyroscope;
an accelerometer;
a microphone;
a magnetometer;
a light sensor;
a radio frequency identification (RFID) reader;
a near-field communications interface;
an application executing on the portable electronic device;
reception quality of a wireless receiver;
a global positioning receiver; and
a wireless radio.

21. A non-transitory computer readable memory containing instructions for identifying a location label of a portable electronic device, the instructions which when executed by a processor perform the method of:
determining values of a plurality of characteristics of an operating environment of a portable electronic device, each of the plurality of characteristics of the operating environment associated with a respective pre-determined unique identifier;
generating a compressed query signature vector from a query signature vector comprising a plurality of key-value pairs, each key-value pair comprising: i) a respective pre-determined unique identifier associated with a corresponding one of the plurality of characteristics of the operating environment and ii) a value for the received characteristic of operating environment corresponding to the respective pre-determined unique identifier; and determining the location label for the portable electronic device by comparing the compressed query signature vector to one or more labeled signature vectors that are similar to the compressed query signature vector, each labeled signature vector comprising a previously generated signature vector and associated with a respective location label.

* * * * *